United States Patent [19]

Black

[11] Patent Number: 6,044,369

[45] Date of Patent: Mar. 28, 2000

[54] HASH TABLE CALL ROUTER FOR WIDELY VARYING FUNCTION INTERFACES

[75] Inventor: Ron L. Black, Austin, Tex.

[73] Assignee: Dell USA, L.P., Round Rock, Tex.

[21] Appl. No.: 09/007,010

[22] Filed: Jan. 14, 1998

[51] Int. Cl.[7] .................................................. G06F 9/00
[52] U.S. Cl. ............................................ 707/4; 707/104
[58] Field of Search ........................................ 707/1–205

[56] References Cited

U.S. PATENT DOCUMENTS

| | | |
|---|---|---|
| 5,546,577 | 8/1996 | Marlin et al. . |
| 5,682,535 | 10/1997 | Knudsen ..................................... 707/1 |
| 5,768,592 | 6/1998 | Chang ..................................... 707/100 |
| 5,862,338 | 1/1999 | Walker et al. ........................... 707/100 |
| 5,878,420 | 3/1999 | De La Salle ............................... 707/10 |
| 5,896,321 | 4/1999 | Miller et al. ....................... 365/189.01 |

OTHER PUBLICATIONS

Publication, Desktop Management Taskforce, Mar. 29, 1996, manual relating to Desktop Management Interface Groups.

*Primary Examiner*—Hosain T. Alam
*Assistant Examiner*—John G. Mills
*Attorney, Agent, or Firm*—Haynes and Boone, L.L.P.

[57] ABSTRACT

A technique for retrieving data residing on a data server platform using object-oriented programming techniques in a Desktop Management Interface ("DMI") environment is disclosed. In one embodiment, a data inquiry Router object brings together the many functions and data sources required to service client requests into a cohesive structure. Based on the concept that all data requests can be visualized as the instantiation of a class derived from a hyper-generic base class, a symbiotic structure is be generated that encapsulates the basic client-server interface functionality along with the otherwise unrelated information gathering techniques required to satisfy the request. The base class and all classes derived from it are accessed through an open-addressed hash table based request Router object that bores down to the appropriate piece of data acquisition code and performs query validation and return the requested data structure in the form desired.

20 Claims, 2 Drawing Sheets

HASH TABLE CALL ROUTER FOR WIDELY VARYING FUNCTION INTERFACES

TECHNICAL FIELD

One embodiment relates generally to data retrieval methods in a client-server environment and, more particularly, to a method of using object-oriented programming methods to implement a hash table call router for performing such data retrieval.

BACKGROUND

Desktop Management Interface ("DMI") is a standard interface for the exchange of information between applications on a desktop computer system. This information can be used for management or status purposes. DMI was developed and is managed by a group of companies referred to as the Desktop Management Taskforce ("DMTF"). DMTF published the Desktop Management Interface Specification, Version 2.0, on Mar. 29, 1996, which may be obtained from any company that is a member of DMTF, including Dell Computer Corporation in Austin, Texas, and which is hereby incorporated by reference in its entirety.

FIG. 1 illustrates a computer system 10 having installed thereon an implementation of a DMI 11. As shown in FIG. 1, the DMI 11 is a management interface ("MI") 12, a service layer ("SL") 14, and a component interface ("CI") 16. In accordance with DMI specifications, a description of each component of the computer system 10, collectively illustrated in FIG. 1 as components 18, is defined in a management information format ("MIF") file for that component. In particular, each component 18 has a MIF file that describes its manageable characteristics. When a component is initially installed into the computer system 10, the .MIF file for that component is added to an MIF database 19. According to DMI specifications, the SL 14 is a Windows service application and a running windows application. The SL 14 is the central data distribution point for the DMI 11. The MI 12 generally initiates data transfers with a query to the SL 14. The CI 16 is responsible for returning data to or acting on data transferred from the MI 12 via the SL 14. The CI 16 can also initiate data transfers under certain conditions. Such CI transfers are referred to as "indications."

The components 18 are connected to a central processing unit 19a and memory 19b of the computer 10 in a conventional manner via one or more buses 19c.

As used herein, a "component" is a physical or logical entity on a computer system, including hardware, software, or firmware. Components may come with a computer system or be added later. The software code that carries out management actions for a particular component is the "component instrumentation," which is designated in FIG. 1 by a reference numeral 20.

The CI 16 is used by component vendors to describe access to management information and to enable a component to be managed. The CI 16 shields vendors from the complexity of encoding styles and management registration information for the components. The MI 12 is used by applications installed on of the computer system 10, collectively illustrated in FIG. 1 as applications 22, to enable the applications to manage components 18. The MI 12 shields application vendors from having to understand the different mechanisms used to obtain management information from elements within the computer system 10.

The CI 16 and MI 12 are procedural interfaces used as the medium for data transfer. The behavioral mechanics of the CI 16 and MI 12 comprise the data transfer mechanism. The SL 14 is an active, resident piece of code running on the computer system 10 that mediates between the MI 12 and CI 16 and provides access to the MIF database 19.

In implementing DMI specifications, MIF files must be created in adherence with the DMI format. Files created in that format describe components, which have attributes that have values and whose attributes can be assembled into groups. As previously described, a "component" is any hardware, software, or firmware that can be connected to or installed on a computer system. An "attribute" is a characteristic, function, or feature of a component; specifically, a relevant and manageable characteristic. Applications that monitor and control a component utilize its attributes to manage it.

A "group" refers to a group of attributes. Attributes are assembled into groups based on their similarity of function or purpose. Attributes of components have "values." Some of these values are static, such as the component type, while others are dynamic, such as the status of the component (e.g., busy or idle).

.MIF files describe components and their attributes. Each component manufacturer provides a MIF file that describes the characteristics of the component that can be managed. A component's MIF file is installed into the MIF database 19 when the component is installed in the computer system 10. The component makes itself known to the computer system 10 via the MIF database 19.

In the MIF database 19, attributes may have a single value or they may be group attributes defining a table or array of related attributes and their values. Whenever the various attributes in a group define one or more rows in a table, a "key" is needed to define the attribute IDs that are used as indices to the table. By use of the key the particular row and attribute in the table is found.

As previously indicated, some attributes represent static information, while others represent dynamic information. To obtain static information, the request for an attribute value is fielded by the SL 14 and reference is made to the MIF database 19 to respond to the query. The same approach may be used for dynamic information, but the database attribute value may be outdated and therefore inaccurate. To obtain current values of dynamically changing attributes, the DMI makes available component instrumentation code 20 for acquiring the attribute value from its source. When the component instrumentation 20 is used, the SI, 14 branches to the component instrumentation to obtain the latest value for that attribute.

As previously indicated, the MI 12 interfaces with the applications 22 to provide access to the database 19 for management functions. A command is used by the applications 22 to request information through the SL, 14 for a particular component 18. The SL 14 acknowledges receipt of the request and issues as many requests to different component instrumentations 20 as necessary to satisfy the management request. If the initial request was for static information, the SL 14 would find that information in the database 19. However, if the request was for the current state of a component, the SL 14 acts as a mediator between the requesting application, via the MI 12, and the component and addresses the component instrumentation 20 through the CI 16 to obtain the current state of the component. Once obtained, the information is passed onto the requesting application through the MI 12.

Client-server applications that rely on the acquisition of a diverse collection of data from information servers can create a confusing tangle of underlying programmatic access methods needed to retrieve data residing on that data server platform. One drawback to the current implementation of DMI described above is that each time the CI 16 changes, the component instrumentation 20 must also be rewritten, requiring investment of a substantial amount of additional time and money.

Therefore, what is needed is an improved method of performing data retrieval from a diverse collection of data storage devices in a DMI or other similar client-server environment

SUMMARY

One embodiment is a technique for retrieving data residing on a data server platform using object-oriented programming techniques. In particular, a data inquiry Router object brings together the many functions and data sources required to service client requests into a cohesive structure. By utilizing the virtual capabilities of an object-oriented programming language, such as C++, an useful application paradigm for implementing component instrumentation is developed.

Based on the concept that all data requests can be visualized as the instantiation of a class derived from a hyper-generic base class, herein referred to as "Instrument," a symbiotic structure can be generated that encapsulates the basic client-server interface functionality along with the otherwise unrelated information gathering techniques required to satisfy the request. The Instrument base class and all classes derived from it are accessed through a request Router object that can bore down to the appropriate piece of data acquisition code and perform query validation and return the requested data structure in the form desired.

The Instrument class is a pure virtual base class with a group of virtual methods. These methods are generic in nature and designed to be used globally by all instantiations of class objects derived from the base class. Classes derived from the base class overload or redefine the universal class methods to achieve their unique functionality. Due to the object-oriented construct of base class pointers, any class derived from the base class can be accessed through an identical pointer variable. This allows each of the base class methods to be accessed using a single pointer variable regardless of the underlying data acquisition function implementation. Exploiting this identity in access, a pointer to each of the derived class objects is stored in and accessed from an open-address hash table. Generally, in client-server information applications, a given request ultimately breaks down to a unique entity that can be represented by a large integer from a larger "universe" of all such requests. Since the space from which the information symbols (in this case, integer pairs) may be drawn is typically much larger than the actual number of queries that can be made, the hash table limits the size to exactly what is needed and facilitates efficient accesses of the virtual methods. When a given integer symbol, representing a request, is obtained from the hash table of pointers by the Router object, the pointer can be used to execute any of the virtual methods defined by the base class.

A technical advantage is that the functionality of an almost infinite assortment of diverse types of programmatic paradigms is mapped into a single access method, creating a quick switch mechanism that can be used in query resolution and in returning requested information.

Another technical advantage is that the access efficiency of the preferred embodiment results in modular, and hence extensible and maintainable code.

DESCRIPTION OF THE PREFERRED EMBODIMENT

Figure 1:
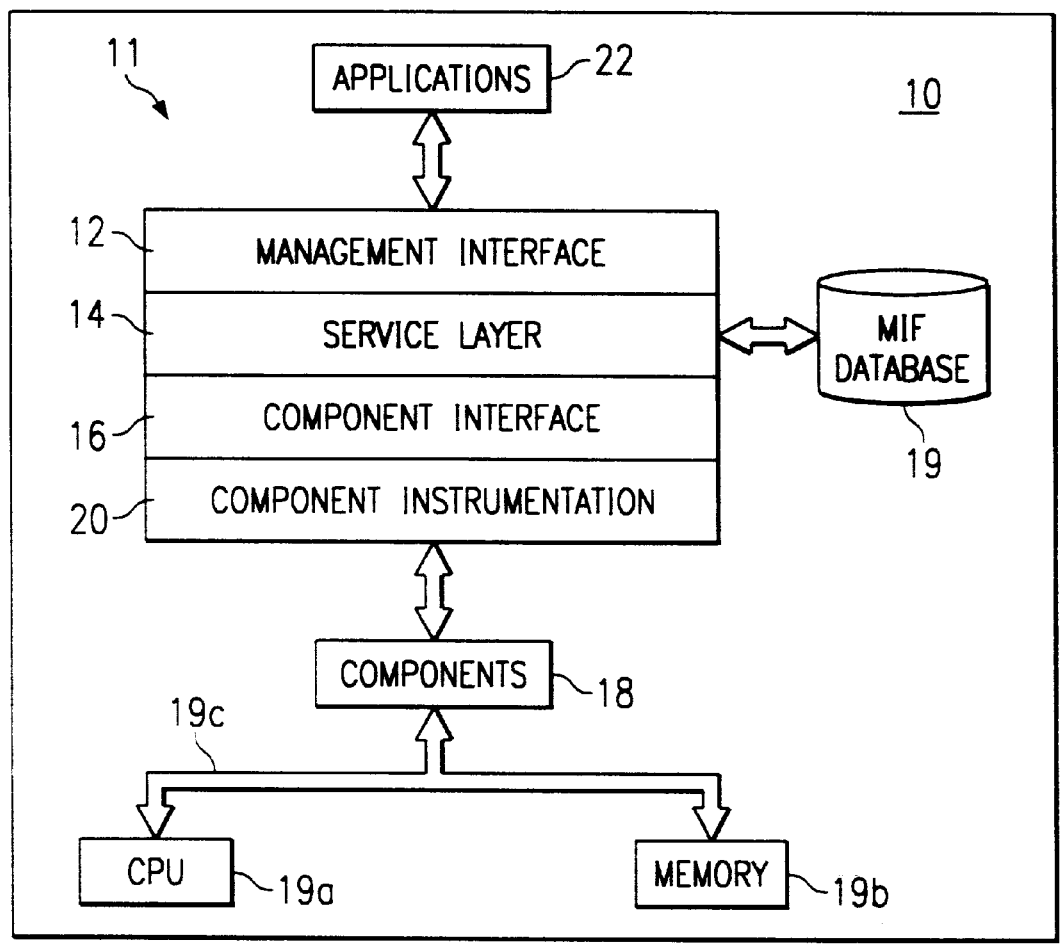
FIG. 1 is a block diagram of a computer system having installed thereon a Desktop Management Interface ("DMI").

As discussed in detail above, FIG. 1 illustrates computer system 10 comprising a DMI 11.

Figure 2:
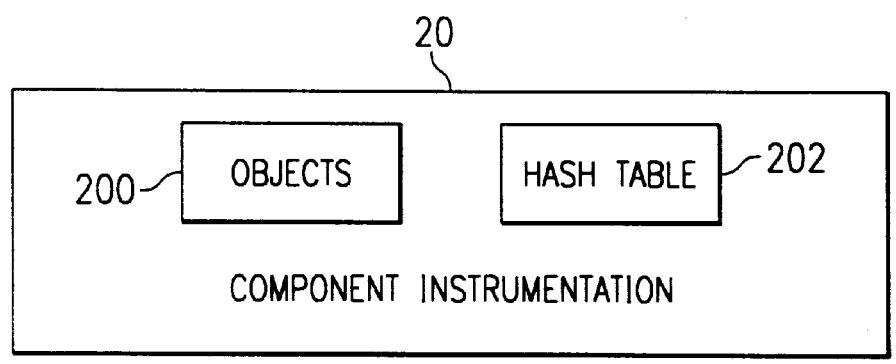
FIG. 2 is a block diagram of a component instrumentation embodying features of a preferred embodiment.

FIG. 2 is a more detailed block diagram of the component instrumentation 20 of FIG. 1 embodying features of a preferred embodiment. As shown in FIG. 2, the component instrumentation 20 includes an "objects" portion 200 and an open-addressed hash table ("hash table") 202. As described in greater detail below, the objects portion 200 of the component instrumentation 20 includes several objects derived from a hyper-generic virtual base class designated "Instrument". For purposes that will also be explained in greater detail below, the hash table 202 is a map of pointers to Instrument objects of the objects portion 200. The pointers are placed into the map using a hashing function based on group and attribute (integer pairs).

Figure 3:
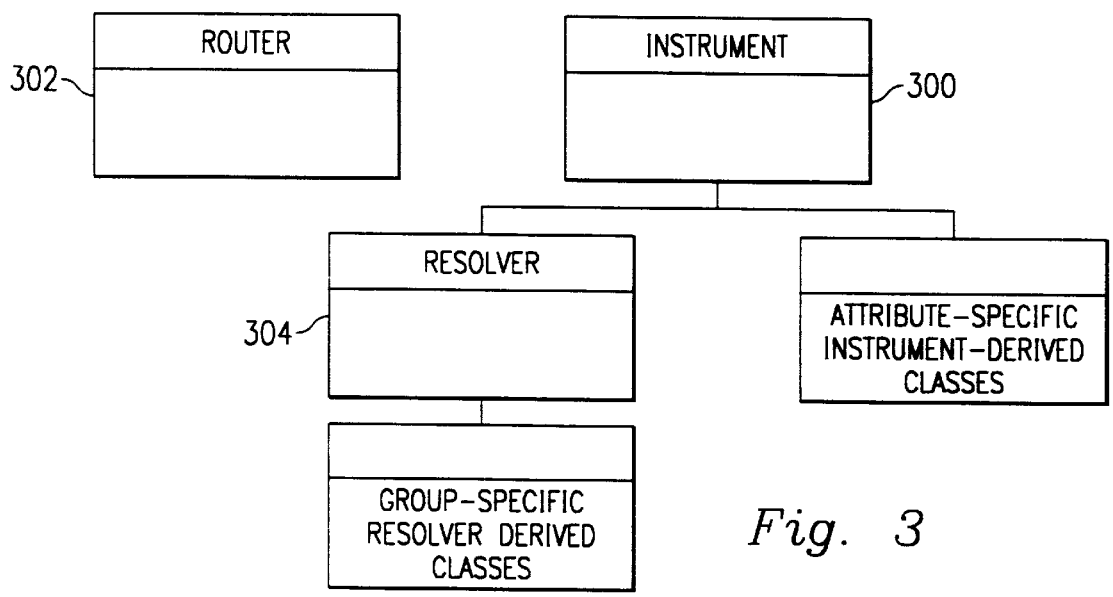
FIG. 3 is a class hierarchy of an objects portion of the component instrumentation of FIG. 2.

FIG. 3 illustrates a class hierarchy of the objects comprising the objects portion 200. As illustrated in FIG. 3, the fundamental working class in the preferred embodiment is the virtual base class Instrument 300. All other working objects are instantiations of classes derived from the Instrument class 300. The variations from the base class 300 are incorporated as required to fulfill the functional specifics of the instrumentation being implemented. Access to the different objects is performed via virtual base class methods that can be exercised with a generic Instrument pointer. This makes possible the use of a flexible Router object 302 that can point at and actuate any object derived from Instrument.

The most notable Instrument-derived class is the Resolver class 304. Objects of the Resolver class 304 perform the special function of database searching through a collection of subordinate objects, based on the unique request structure imposed by the SL 14. The actual data access methods are divided into two separate approaches for multiple instance and singular groups. These represent fundamental differences in the nature of what is being requested and how compliance with the request can be resolved. The Resolver class 304 exists solely for the purpose of gaining access to the desired attribute based on complex search criteria.

An object derived from the Resolver class 304, or multiple instance, Instrument groups can obtain the value for any of n_max (e.g., 7) instances of an associated attribute. A Resolver::Get_Data(command,index) method, which is described in greater detail below, will recover the answer for any group/attribute pair based on a "key list" provided by the MI 12 as search criteria for searching the group space. The index into the hash table 202 indicates which index parameter will be passed to the appropriate Instrument::Get_Data (x, y) member function described below. Note that instances of a given Instrument object are not new objects, only a specific parameter passed to the object to determine which value in the column it is to return.

Singular Instrument groups are made up of a set of related Instrument objects that are not controlled by a Resolver object. Singular groups are generally computer system specific groups that have only one occurrence, such as customer name, address, and telephone number, or monitor type, resolution, and settings. The Instrument objects that make up these groups are not logically connected except by the fact that the assigned group numbers (required by the Router object) are the same. Since these attributes have a depth of 1, there is no need for an index parameter, although a dummy value is required for the Instrument class 300 Get_Data(x, y) method.

The Router object 302 can identify singular Instrument groups by the number of key values in the key list passed by the SL 14. For singular instance groups, this value will be zero.

Class member (i.e., data and methods) details are set forth below.

Instrument Class Member Details
Data:
    error_level
        represents the current error status of the object
    type
        the type of data structure (e.g., DMI_STRING) the attribute represents
    max_items
        the maximum range through which this attribute can be exercised. This represents the depth of the table (if applicable). The associated Resolver object will set this value for each Instrument object for which it is responsible Methods:
    virtual void Get_Data(DMI_INT command, DMI_INT index)
        This method gets the attribute values for comparison or to be returned to the SL. Get_Data(x, y) places its data pointer in the global glob_attr structure where it is returned to the SL or copied into a Resolver object data structure for comparison with KeyList values.
        The command parameter is used to determine the type of action required by the object (e.g., get_next_attribute)
        The index parameter is used to identify the instance (row) in a multiple instance group to which this call should refer.
        Note that the bulk of the instrumentation code resides in these methods for each Instrument object (attribute).
        This virtual method must be declared using the same parameters and return value in all derived classes to allow the use of an Instrument base class pointer in the Router object to access all Instruments.
    Get_Type (void)
        Inline defined for all classes derived from Instrument to return the type data member. This method can be accessed like Get_Data( ) with a valid base class pointer.

Router Class Member Details
Data:
    OpenAddressedHashTable map
        This class incorporates all the functionality necessary to implement hash table pointer storage and retrieval
        The map of pointers to Instrument objects (derived from the class Instrument) that are placed into the map using a hashing function based on group and attribute. Resolve objects are hashed by group with attribute=0.

Methods:
    populate_map( )
        Instantiates all Instrument and Resolver objects of the entire component interface map. It also inserts the pointers to these objects into the map.
    get_hash(group,attribute)
        returns a 16-bit hash value based on group and attribute values
    resolve_objects (void)
        returns an Instrument object pointer to the object identified by (group, attribute) in the map. By using the returned pointer, all Instrument and resolver objects in the table can be accessed. Note that only those member functions that are virtual in the base class can be accessed using this technique. The Get_Data (x,y) method must be defined in all classes derived from Instrument. Resolver objects also define this method, but use it to perform a search of other attributes that actually "get_data".

Router Class Member Details
Data:
    Router *rtr
        gives the Resolver object access to the Router object methods, especially Get_Hash( ) and resolve_object( ), which allow the Resolver object to perform Get_Data( ) and Get_Type( ) for each of their subordinate Instrument objects.
    void *s_data
        a generic pointer to data, access to which is determined by the type value of the data being examined. This pointer is used primarily by the Compare( ) method, which must decode the type of data before making a comparison.

Methods:
    virtual void Get_Data(command,index)
        basically calls the Do_Search( ) method, which compares the values returned from Instrument Get_Data( ) calls to KeyList data values.
    void Set_Group_Values( )
        performs the processing required to set max_items (table depth) for all subordinate Instrument objects.
    void Do_Search( )
        searches the table space using KeyList values passed by the SL and compares the values to subordinate instrument objet return values. Do_Search( ) can return to the Resolver object either an attribute value or a key value, depending on the values of certain confirm and request buffer members.
    BOOL Compare(void)
        compares each of the different types of data structure available from an Instrument object.

Figure 4:
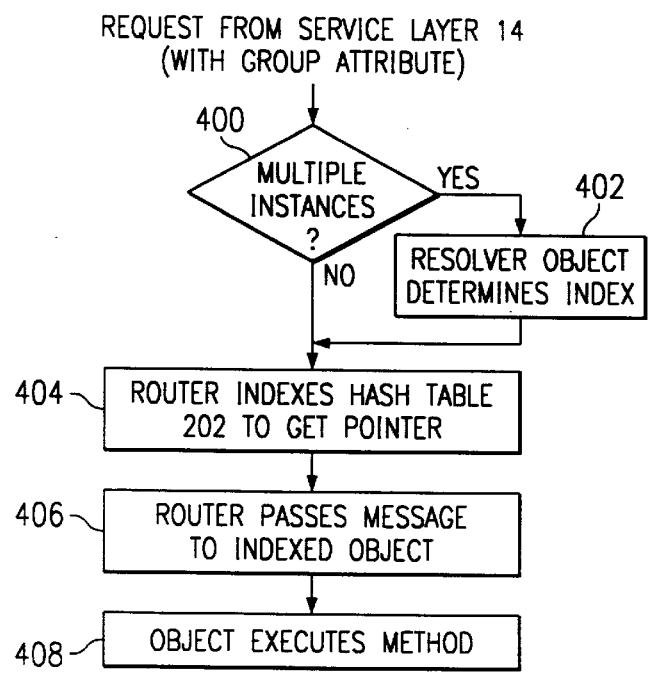
FIG. 4 is a flowchart of the operation of a preferred embodiment.

FIG. 4 is a flowchart of the operation of a preferred embodiment. As shown in FIG. 4, in response to a request from the SL 14, via the CI 16, in step 400, a determination will be made whether the request relates to a component of which there are multiple instances, as determined by the MIF file and the CI implementation. For example, the request may relate to a disk drive, of which there may be multiple ones in the computer system 10. If so, execution proceeds to step 402, in which the Resolver object determines which instance is being requested by performing a linear search of all attributes identified by the key list and returns an index of that set or row of attributes, if one exists. Execution then proceeds to step 404. Similarly, if in step 400 it is determined that there are not multiple instances, execution proceeds directly to step 404.

In step 404, the Router object 302 indexes the hash table 202 using the group and attribute provided in the request from the SL 14 and the index from step 402, if that step was executed, to obtain a pointer. In step 406, the Router object 302 sends a message to the object indexed by the pointer. In step 408, the indexed object executes the requested function and returns the requested data to the SL 14 via the CI 16.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A computer-implemented method for retrieving data relating to one of a plurality of computer components, the method comprising:

responsive to a request for data including a group and an attribute, determining whether said request relates to a component of which there are multiple instances;

if said request relates to a component of which there are multiple instances, performing a linear search of all attributes identified in a key list to obtain an index of said attribute of said request;

indexing a hash table comprising a map of pointers to instrument objects using said group and said attribute of said request and said index to obtain a pointer to one of said instrument objects;

sending a message to said one of said instrument objects for causing said one of said instrument objects to implement a particular method and obtain said requested data; and returning said requested data.

2. The method of claim 1 wherein said performing a linear search is performed by a Router object.

3. The method of claim 1 wherein each of said instrument objects corresponds to one of said components.

4. The method of claim 1 wherein said method is implemented in a desktop management interface ("DMI") environment.

5. The method of claim 4 wherein said DMI comprises a management interface ("MI"), a service layer ("SL"), and a component interface ("CI").

6. The method of claim 5 further comprising:

said MI receiving said request from an application and forwarding said request to said SL;

said SL forwarding said request to said CI.

7. The method of claim 5 wherein said performing a linear search, indexing a hash table, sending a message, and returning said requested data are performed by a component instrumentation, said component instrumentation providing an interface between said CI and said components.

8. A system for retrieving data relating to one of a plurality of computer components, the system comprising:

means responsive to a request for data including a group and an attribute for determining whether said request relates to a component of which there are multiple instances;

means for performing a linear search of all attributes identified in a key list to obtain an index of said attribute of said request if said request relates to a component of which there are multiple instances;

means for indexing a hash table comprising a map of pointers to instrument objects using said group and said attribute of said request and said index to obtain a pointer to one of said instrument objects;

means for sending a message to said one of said instrument objects for causing said one of said instrument objects to implement a particular method and obtain said requested data; and means for returning said requested data.

9. The system of claim 8 wherein said means for performing a linear search comprises a Router object.

10. The system of claim 8 wherein each of said instrument objects corresponds to one of said components.

11. The system of claim 8 wherein said system is implemented in a desktop management interface ("DMI") environment.

12. The system of claim 11 wherein said DMI comprises a management interface ("MI"), a service layer ("SL"), and a component interface ("CI").

13. The system of claim 12 wherein said MI receives said request from an application and forwards said request to said SL and said SL forwards said request to said CI.

14. The system of claim 12 wherein said means for performing a linear search, said means for indexing a hash table, said means for sending a message, and said means for returning said requested data comprise a component instrumentation, said component instrumentation providing an interface between said CI and said components.

15. In a computer comprising a central processing unit ("CPU"), memory, and a plurality of components, a system for retrieving data relating to one of said components in response to a request from an application comprising a group and an attribute, the system comprising:

a plurality of instrument objects corresponding to said components;

a hash table comprising a map of pointers to said instrument objects; and a Router object for indexing a pointer of said hash table using said group and said attribute and sending a message to said instrument objects pointed to said indexed pointer.

16. The system of claim 15 wherein said instrument objects, said hash table, and said Router object together comprise a component instrumentation layer.

17. The system of claim 16 further comprising a desktop management interface ("DMI") including a management interface ("MI"), a service layer ("SL"), and a component interface ("CI"), wherein said component instrumentation layer provides an interface between said DMI and said components.

18. The system of claim 17 wherein said MI receives said request from an application and forwards said request to said SL and said SL forwards said request to said CI.

19. The system of claim 15 wherein said Router object performs a linear search of all attributes identified in a key list to obtain an index of said attribute of said request if said request relates to a component of which there are multiple instances.

20. The system of claim 19 wherein said Router object indexes said hash table using said group, said attribute, and said index.

* * * * *